(12) United States Patent
Tanaka et al.

(10) Patent No.: US 10,590,826 B2
(45) Date of Patent: Mar. 17, 2020

(54) SECONDARY AIR INTRODUCTION DEVICE

(71) Applicant: SUZUKI MOTOR CORPORATION, Hamamatsu-shi, Shizuoka (JP)

(72) Inventors: Kazuhiro Tanaka, Hamamatsu (JP); Yoshikatsu Akita, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 68 days.

(21) Appl. No.: 15/943,273

(22) Filed: Apr. 2, 2018

(65) Prior Publication Data

US 2018/0291791 A1 Oct. 11, 2018

(30) Foreign Application Priority Data

Apr. 10, 2017 (JP) ................... 2017-077330

(51) Int. Cl.
*F01N 3/34* (2006.01)
*F02F 1/42* (2006.01)
(Continued)

(52) U.S. Cl.
CPC ............. *F01N 3/34* (2013.01); *F01N 3/22* (2013.01); *F01N 3/227* (2013.01); *F01N 3/30* (2013.01); *F01N 13/08* (2013.01); *F01N 13/105* (2013.01); *F02F 1/4264* (2013.01); *F01N 2270/00* (2013.01); *F01N 2470/30* (2013.01);
(Continued)

(58) Field of Classification Search
CPC .... F01N 13/08; F01N 13/105; F01N 2270/00; F01N 2470/30; F01N 2590/04; F01N 3/22; F01N 3/227; F01N 3/30; F01N 3/34; F02B 61/02; F02F 1/4264; Y02T 10/20
See application file for complete search history.

(56) References Cited

U.S. PATENT DOCUMENTS 7,201,189 B2 * 4/2007 Inui .......................... F01L 3/205
137/512.15

FOREIGN PATENT DOCUMENTS

EP 2 022 955 A2 7/2008
EP 3 051 090 A1 1/2016
(Continued)

OTHER PUBLICATIONS

Extended European Search Report dated May 18, 2018, issued by the European Patent Office in corresponding application EP 18165002.9.

*Primary Examiner* — Phutthiwat Wongwian
*Assistant Examiner* — Diem T Tran
(74) *Attorney, Agent, or Firm* — Stein IP, LLC

(57) ABSTRACT

There is provided a secondary air introduction device configured to introduce air into an exhaust port provided in a cylinder head of an engine by using a negative pressure in the exhaust port. A back-flow restriction member is provided between a reed valve and the exhaust port in an air introduction passage, and includes a plate part intersecting with an extension direction of the air introduction passage. The plate part has an air passing region in which the air flowing through the air introduction passage from an air intake unit toward the exhaust port is enabled to pass therethrough and a back-flow cutoff region in which exhaust air, which flows in a direction of directly colliding with at least a valve body of the reed valve, of exhaust air flowing back through the air introduction passage from the exhaust port is cut off.

5 Claims, 6 Drawing Sheets

(51) Int. Cl.
  *F01N 3/22* (2006.01)
  *F01N 13/08* (2010.01)
  *F01N 3/30* (2006.01)
  *F01N 13/10* (2010.01)
  *F02B 61/02* (2006.01)

(52) U.S. Cl.
  CPC .......... *F01N 2590/04* (2013.01); *F02B 61/02* (2013.01); *Y02T 10/20* (2013.01)

(56) References Cited

FOREIGN PATENT DOCUMENTS

| | | | |
|---|---|---|---|
| JP | 3330019 | * | 7/2002 |
| JP | 3330019 | B2 | 7/2002 |

* cited by examiner

SECONDARY AIR INTRODUCTION DEVICE

CROSS-REFERENCE TO RELATED APPLICATIONS

The disclosure of Japanese Patent Application No. 2017-077330 filed on Apr. 10, 2017, including specification, drawings and claims is incorporated herein by reference in its entirety.

TECHNICAL FIELD

The present disclosure relates to a secondary air introduction device configured to supply air into an exhaust port provided in a cylinder head of an engine by using a negative pressure in the exhaust port.

BACKGROUND

In some cases, an engine of a motorcycle or the like may be provided with a secondary air introduction device configured to supply air into an exhaust port by using a negative pressure in the exhaust port. According to the secondary air introduction device, it is possible to combust an unburnt gas in exhaust air to be discharged from a combustion chamber by the air introduced into the exhaust port. Thereby, it is possible to increase a temperature of the exhaust air upon start of the engine and the like, thereby activating catalyst in early stage.

The secondary air introduction device is configured by forming a passage for introducing the air from an air cleaner of an air intake system into the exhaust port, forming a valve chamber in the middle of the passage and providing a reed valve in the valve chamber, for example. In the secondary air introduction device, when a negative pressure is generated in the exhaust port by pulsation of the exhaust air, the reed valve is opened by the negative pressure, so that the air is sucked from the air cleaner into the exhaust port (refer to Patent Document 1).

Patent Document 1: Japanese Patent No. 3,330,019B

In the secondary air supply device, in order to open the reed valve by the negative pressure in the exhaust port and to thereby take the air into the exhaust port, the valve chamber and the exhaust port are configured to communicate with each other by a passage formed in the cylinder head and the like, for example. For this reason, for example, immediately after the exhaust valve is opened and the exhaust air is thus discharged from the combustion chamber, a part of the exhaust air may flow back through the passage between the valve chamber and the exhaust port and directly collide with a valve body of the reed valve provided in the valve chamber.

When the high-pressure exhaust air having flowed back directly collides with the valve body of the reed valve, the valve body is vibrated. By the vibration, the deterioration of the valve body may be accelerated or the valve body may be damaged. Also, the high-temperature exhaust air having flowed back may be introduced into the air cleaner through a gap between the valve body and a valve seat, which is formed due to the vibration of the valve body. In this case, a seal member formed at a part, on which the valve body is seated, of the valve seat of the reed valve may be deteriorated or eroded in early stage by heat of the exhaust air.

Also, the reed valve has a stopper configured to restrain an amount of movement of the valve body in a direction of separating from the valve seat. Depending on an angle at which the passage configured to communicate the valve chamber and the exhaust port each other is connected in the valve chamber, a mounting position of the reed valve in the valve chamber, and the like, the exhaust air having flowed back may directly enter between the valve body of the reed valve and the stopper and flow at high speed between the valve body and the stopper, so that the valve body may be floated from the valve seat by a stream of the exhaust air. For this reason, the high-temperature exhaust air may flow back toward the air cleaner beyond the reed valve, thereby deteriorating or damaging a piping and the like provided on a path between the air cleaner and the valve chamber, for example.

Patent Document 1 discloses a configuration where a heat shield plate is provided in a region of the exhaust port-side in the valve chamber having the reed valve provided therein. The heat shield plate is formed of alumina, and the heat shield plate is provided with a plurality of vent holes. The exhaust air having flowed back passes through the heat shield plate and reaches the reed valve. Patent Document 1 discloses that when the exhaust air passes through the heat shield plate, the heat of the exhaust air is dissipated by the heat shield plate and the temperature of the exhaust air is thus lowered.

However, as shown in FIG. 6 of Patent Document 1, a substrate of the heat shield plate is formed with the plurality of vent holes over the entire region. For this reason, the exhaust air having flowed back may pass through the vent holes and directly collide with the valve body of the reed valve, thereby vibrating the valve body. Alternatively, the exhaust air having flowed back may pass through the vent holes and directly enter between the valve body and the stopper of the reed valve, thereby floating the valve body.

SUMMARY

It is therefore one of objects of the present disclosure to provide a secondary air introduction device capable of preventing components such as a valve body of a reed valve from being deteriorated or damaged in early stage, which is caused when an exhaust air having flowed back through a passage for introducing air into an exhaust port directly collides with the valve body of the reed valve or directly enters between the valve body and a stopper of the reed valve.

According to an aspect of the present disclosure, a secondary air introduction device configured to introduce air into an exhaust port provided in a cylinder head of an engine by using a negative pressure in the exhaust port, the secondary air introduction device comprising: an air introduction unit having an air introduction passage configured to interconnect an air intake unit for taking therein atmospheric air and the exhaust port; a reed valve provided in the air introduction passage and configured to open and close the air introduction passage in correspondence to a pressure in the exhaust port; and a back-flow restriction member provided between the reed valve and the exhaust port in the air introduction passage, and comprising a plate part having a surface intersecting with an extension direction of the air introduction passage, wherein the plate part has an air passing region in which the air flowing through the air introduction passage from the air intake unit toward the exhaust port is enabled to pass therethrough and a back-flow cutoff region in which exhaust air, which flows in a direction of directly colliding with at least a valve body of the reed valve, of exhaust air flowing back through the air introduction passage from the exhaust port is cut off.

According to the present disclosure, it is possible to prevent components such as the valve body of the reed valve from being deteriorated or damaged in early stage, which is caused when the exhaust air having flowed back through the passage for introducing the air into the exhaust port directly collides with the valve body of the reed valve or directly enters between the valve body and the stopper of the reed valve.

DETAILED DESCRIPTION OF THE EMBODIMENTS

Figure 1:
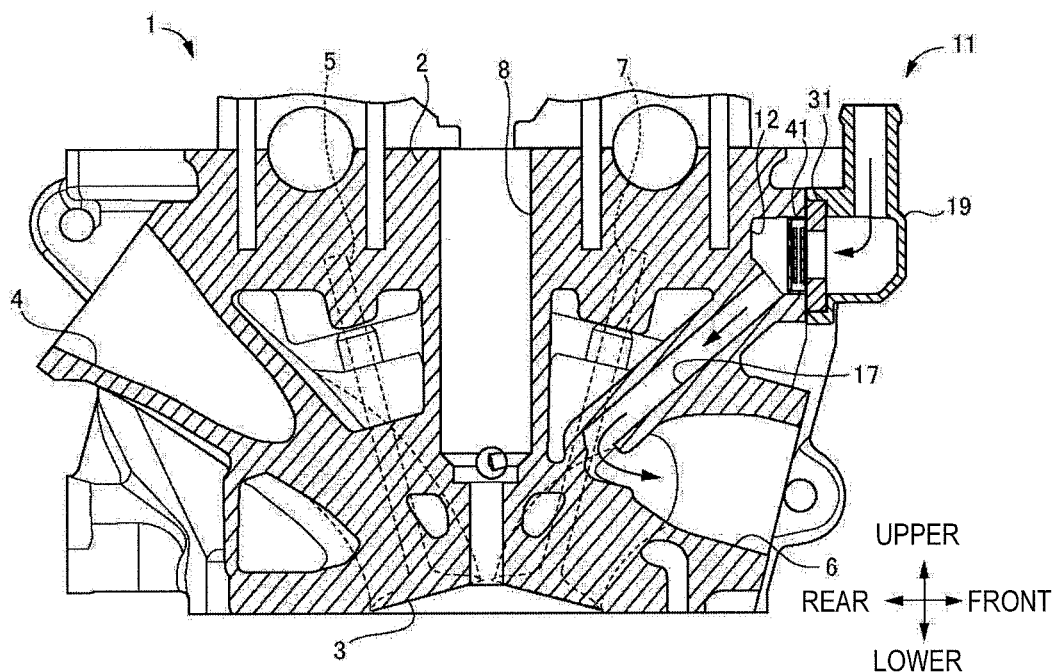
FIG. 1 illustrates a cylinder head having a secondary air introduction device in accordance with an illustrative embodiment of the present disclosure.

A secondary air introduction device of an illustrative embodiment of the present disclosure is a device configured to introduce air into an exhaust port provided in a cylinder head of an engine by using a negative pressure in the exhaust port. The secondary air introduction device includes an air introduction unit having an air introduction passage configured to interconnect an air intake unit for taking therein atmospheric air and an exhaust port, a reed valve provided in the air introduction passage and configured to open and close the air introduction passage in correspondence to a pressure in the exhaust port, and a back-flow restriction member provided between the reed valve and the exhaust port in the air introduction passage.

The back-flow restriction member has a plate part having a surface intersecting with an extension direction of the air introduction passage. The plate part has an air passing region and a back-flow cutoff region. The air passing region is a region in which the air flowing through the air introduction passage from the air intake unit toward the exhaust port is enabled to pass therethrough. The back-flow cutoff region is a region in which exhaust air, which flows in a direction of directly colliding with at least a valve body of the reed valve, of exhaust air flowing back through the air introduction passage from the exhaust port is cut off.

For example, the air passing region is provided with a ventilation structure formed by a plurality of aligned holes. On the other hand, the back-flow cutoff region is not provided with the ventilation structure or is provided with a ventilation structure configured to further restrict flowing of the air or exhaust air than the ventilation structure formed in the air passing region.

In the secondary air introduction device configured as described above, the exhaust air, which flows in the direction of directly colliding with the valve body of the reed valve, of the exhaust air flowing back through the air introduction passage when the exhaust air is discharged from a combustion chamber collides with the back-flow cutoff region of the back-flow restriction member before it reaches the valve body. Thereby, it is possible to prevent the exhaust air from directly colliding with the valve body. Accordingly, it is possible to prevent vibration of the valve body, which is caused when the high-pressure exhaust air directly collides with the valve body. Thereby, it is possible to prevent the valve body from being deteriorated or damaged in early stage, which is caused due to the vibration.

Also, since it is possible to prevent the vibration of the valve body, it is possible to prevent the high-temperature exhaust air from passing through a gap, which is formed when the valve body is separated from the valve seat due to the vibration, and flowing back toward the air intake unit. Therefore, it is possible to prevent a seal member formed on a valve seat of the reed valve, a piping provided on the way to the air intake unit, and the like from being deteriorated or damaged in early stage due to heat of the exhaust air.

Also, the exhaust air, which flows in the direction of directly colliding with the valve body of the reed valve, of the exhaust air having flowed back is caused to collide with the back-flow cutoff region of the back-flow restriction member, so that it is possible to prevent the exhaust air having flowed back from directly entering between the valve body and the stopper of the reed valve. Thereby, it is possible to prevent the valve body from being floated from the valve seat, which is caused when the exhaust air flows between the valve body and the stopper at high speed. Accordingly, it is possible to prevent the high-temperature exhaust air from flowing back toward the air intake unit beyond the reed valve, so that it is possible to prevent the piping and the like provided on the way to the air intake unit from being deteriorated or damaged in early stage.

In the meantime, the air, which is sucked by the negative pressure generated in the exhaust port after the exhaust air is discharged from the combustion chamber, passes through the air passing region of the back-flow restriction member from the air intake unit and smoothly flows toward the exhaust port. That is, according to the back-flow restriction member, it is possible to suppress an increase in pressure loss of the air flowing forward through the air introduction passage while restricting the flowing of the exhaust air flowing back through the air introduction passage.

Illustrative Embodiment (Cylinder Head)

FIG. 1 illustrates a cylinder head 1 having a secondary air introduction device 11 in accordance with an illustrative embodiment of the present disclosure. The cylinder head 1 is provided in an engine of a motorcycle, for example. The cylinder head 1 is a cylinder head for four-valve engine. FIG. 1 depicts a section of one part taken at an intermediate position of the cylinder head 1 in a right and left direction. In FIG. 1, a right side is an exhaust air-side, and is a side facing the front of the motorcycle when the engine is mounted to the motorcycle. On the other hand, a left side of FIG. 1 is an intake air-side, and is a side facing the rear of the motorcycle when the engine is mounted to the motorcycle. In the below, the directions are described on the basis of the front, rear, left, right, upper and lower of a driver of the motorcycle when the engine is mounted to the motorcycle (refer to the arrows shown in the right and lower part of each drawing).

The cylinder head 1 has a cylinder head main body 2 formed of an aluminum alloy, for example. The cylinder head main body 2 is formed with a combustion chamber forming concave part 3, an intake port 4, an exhaust port 6 and a plug hole 8.

The combustion chamber forming concave part 3 is a part that forms a combustion chamber together with an upper surface of a piston when the piston in a cylinder provided below the cylinder head 1 of the engine is positioned at an upper dead center. The combustion chamber forming concave part 3 is formed at a center of a lower surface of the cylinder head main body 2.

The intake port 4 is a port for introducing the air into the combustion chamber. The intake port 4 is formed at a rear part of the cylinder head main body 2. In the intake port 4, an inflow side from which an intake air is to be introduced is one passage but is bifurcated on the way to the combustion chamber. Thereby, an outflow side is configured by two passages, each of which communicates with an inside of the combustion chamber. The two passages of the outflow side of the intake port 4 are provided with intake valves 5 configured to open and close the passages, respectively.

The exhaust port 6 is a port for discharging the exhaust air from the combustion chamber. The exhaust port 6 is formed at a front part of the cylinder head main body 2. In the exhaust port 6, an inflow side from which the exhaust air is to be introduced is two passages, each of which communicates with the combustion chamber and joins on the way from the combustion chamber. Thereby, an outflow side is configured by one passage. The two passages of the inflow side of the exhaust port 6 are provided with exhaust valves 7 configured to open and close the passages, respectively.

The plug hole 8 is a hole for accommodating therein an ignition plug. The plug hole 8 is formed between the intake port 4 and the exhaust port 6.

Also, the cylinder head 1 is provided with the secondary air introduction device 11 in accordance with the illustrative embodiment of the present disclosure. The secondary air introduction device 11 is provided above the exhaust port 6 at the front part of the cylinder head main body.

(Secondary Air Introduction Device)

Figure 2:
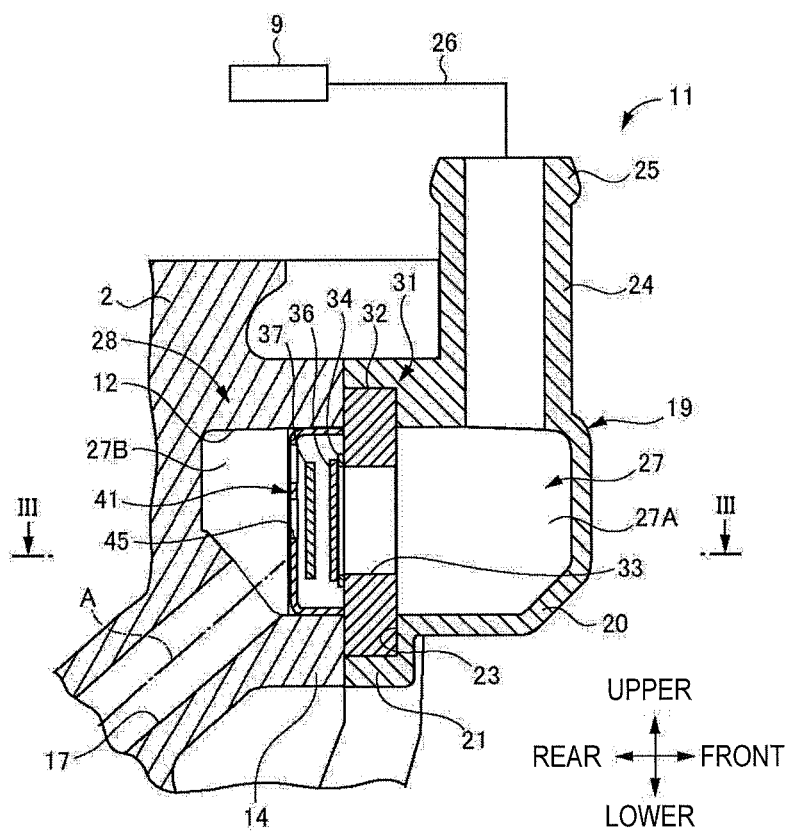
FIG. 2 illustrates the secondary air introduction device in accordance with the illustrative embodiment of the present disclosure.
Figure 3:
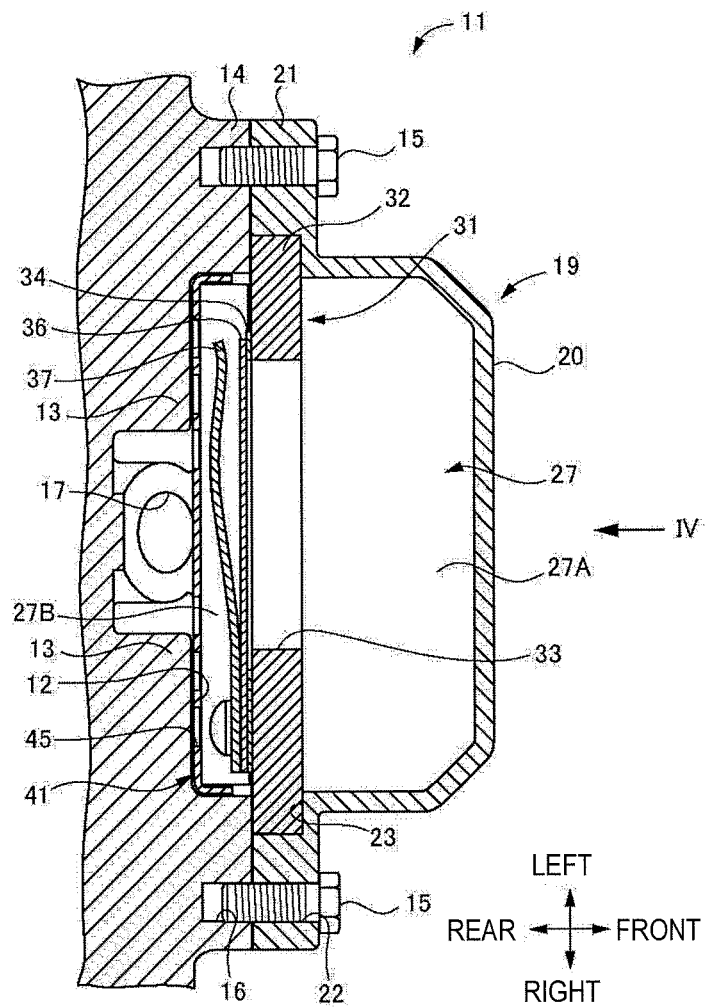
FIG. 3 illustrates the secondary air introduction device, as seen from a direction of an arrow III-III in FIG. 2.
Figure 4:
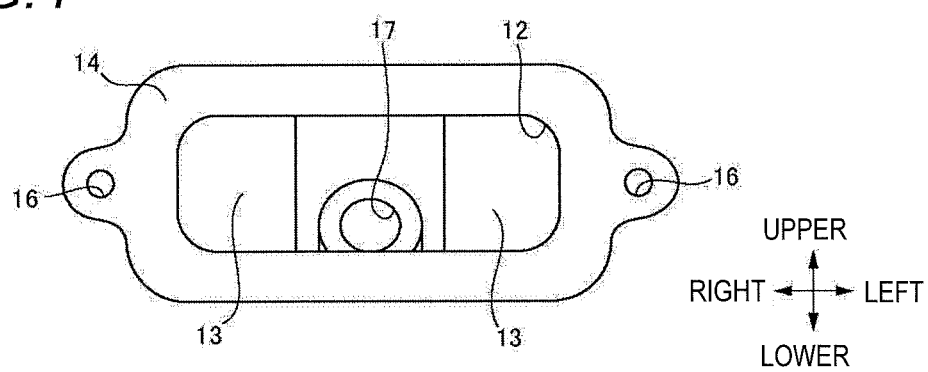
FIG. 4 illustrates a valve chamber forming concave part and an opening of an in-head passage, as seen from a direction of an arrow IV in FIG. 3.
Figure 5:
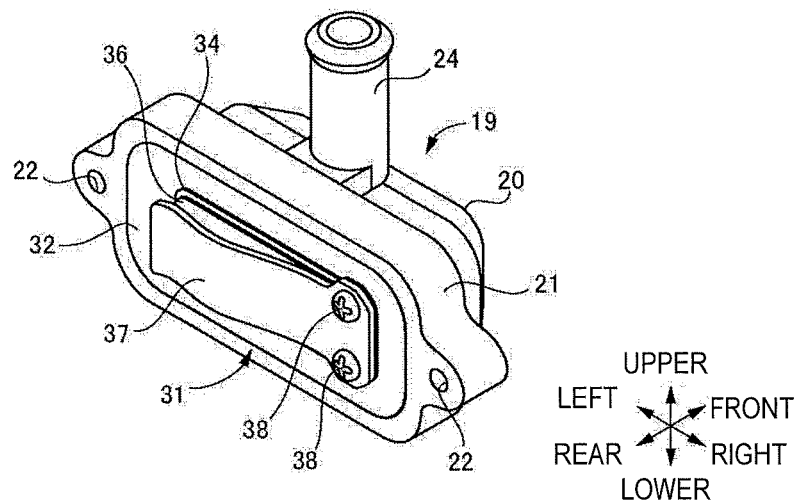
FIG. 5 is a perspective view depicting a valve cover to which a reed valve is mounted, in the secondary air introduction device in accordance with the illustrative embodiment of the present disclosure.

FIG. 2 depicts the secondary air introduction device 11. FIG. 3 illustrates the secondary air introduction device 11, as seen from a direction of an arrow III-III in FIG. 2. FIG. 4 illustrates a valve chamber forming concave part 12 and an in-head passage 17, as seen from a direction of an arrow IV in FIG. 3, at a state where a valve cover 19, a reed valve 31 and a back-flow restriction member 41 are demounted. FIG. 5 depicts the valve cover 19 to which the reed valve 31 is mounted.

The secondary air introduction device 11 is a device configured to introduce the air into the exhaust port 6 by using a negative pressure in the exhaust port 6. As shown in FIG. 2 or 3, the secondary air introduction device 11 includes the valve chamber forming concave part 12, the in-head passage 17, the valve cover 19, the reed valve 31, and the back-flow restriction member 41.

The valve chamber forming concave part 12 is a concave part for forming a valve chamber 27 together with the valve cover 19. The valve chamber forming concave part 12 is formed at an intermediate part of a front and upper part of the cylinder head main body 2 in the right and left direction, and opens to a front surface of the cylinder head main body 2. Also, as shown in FIG. 3, left and right parts of the valve chamber forming concave part 12 are configured as shallow parts 13 of which depths are shallower than an intermediate part in the right and left direction. Also, as shown in FIG. 4, the opening of the valve chamber forming concave part 12 is formed with a valve cover mounting part 14 for mounting the valve cover 19 thereto. Also, the valve cover mounting part 14 is formed with holes 16 for screwing therein bolts 15 for fixing the valve cover 19.

The in-head passage 17 is a passage configured to interconnect the valve chamber 27 and the exhaust port 6. The in-head passage 17 is a hole formed in the cylinder head main body 2 by casting or drilling, for example. As shown in FIG. 1, the in-head passage 17 is formed in an intermediate part of the front part of the cylinder head main body 2 in the right and left direction. As shown in FIG. 2 or 3, an air inflow end-side of the in-head passage 17, into which the air is to be introduced, is configured to communicate with an inside of chamber forming concave part 12, i.e., an inside of the valve chamber 27. Specifically, the air inflow end-side of the in-head passage 17 opens to an intermediate part of the inner (rear) and lower part of the valve chamber forming concave part 12 in the right and left direction. In the meantime, an air outflow end-side of the in-head passage 17, from which the air is to flow out, is configured to communicate with an inside of the exhaust port 6. Specifically, as shown in FIG. 1, the air outflow end-side of the in-head passage 17 opens to the part of the exhaust port 6, at which the two passages of the outflow side join. Also, the in-head passage 17 is inclined so that the air outflow end-side is located at the rear of the air inflow end-side, and extends linearly in an upper and lower direction.

The valve cover 19 is a member configured to form the valve chamber 27 together with the valve chamber forming concave part 12. The valve cover 19 is formed of a resin having high heat resistance, for example. As shown in FIG. 2, 3 or 5, the valve cover 19 has a cover main body 20 and a pipe member 24.

The cover main body 20 has a box shape, and a rear part thereof is opened. Also, an outer periphery of the rear part of the cover main body 20 is formed with a flange portion 21 protruding outward over its entire circumference. Also, the flange portion 21 is formed with holes 22 through which the bolts 15 for fixing the valve cover 19 to the valve chamber forming concave part 12 are to pass. Also, a rear end portion of the cover main body 20 is formed with a valve mounting part 23 for mounting the reed valve 31.

The pipe member 24 has a cylinder shape and extends upward from an intermediate part of an upper part of the cover main body 20 in the right and left direction. An upper end portion of the pipe member 24 is formed with a connection part 25 for connection with an air introduction hose 26 configured to introduce the air into the valve chamber 27 from an air cleaner 9 as the air intake unit.

As shown in FIG. 2 or 3, after the back-flow restriction member 41 is put in the valve chamber forming concave part 12 and the reed valve 31 is mounted to the valve mounting part 23 of the valve cover 19, the valve cover 19 is mounted to the valve cover mounting part 14 so as to close the valve chamber forming concave part 12, and the valve cover and the valve covering mounting part are fixed by the bolts 15. Thereby, the valve chamber 27 is formed by the valve chamber forming concave part 12 and the cover main body 20. The valve chamber 27 has an upstream chamber 27A positioned in front of the reed valve 31 and a downstream chamber 27B positioned at the rear of the reed valve 31. The upstream chamber 27A is positioned upstream with respect to an air flowing direction. A passage of the pipe member 24 is configured to communicate with the upstream chamber 27A. The downstream chamber 27B is positioned downstream with respect to the air flowing direction. The downstream chamber 27B is configured to communicate with the in-head passage 17. In the meantime, the air cleaner 9 and the connection part 25 of the valve cover 19 are interconnected by the air introduction hose 26, so that a passage configured to interconnect the air cleaner 9 and the valve chamber 27 is formed. In this way, the valve cover 19 is mounted to the valve chamber forming concave part 12 and the connection part 25 of the valve cover 19 and the air cleaner 9 are interconnected by the air introduction hose 26, so that an air introduction passage 28 configured to interconnect the air cleaner 9 and the exhaust port 6 is formed.

(Reed Valve)

Figure 6:
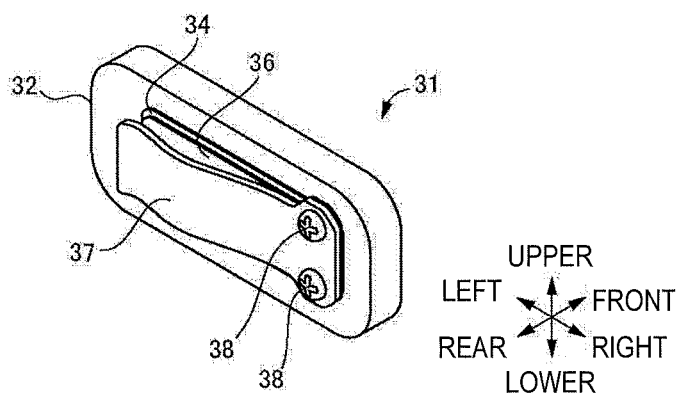
FIG. 6 is a perspective view depicting the reed valve of the secondary air introduction device in accordance with the illustrative embodiment of the present disclosure.
Figure 7:
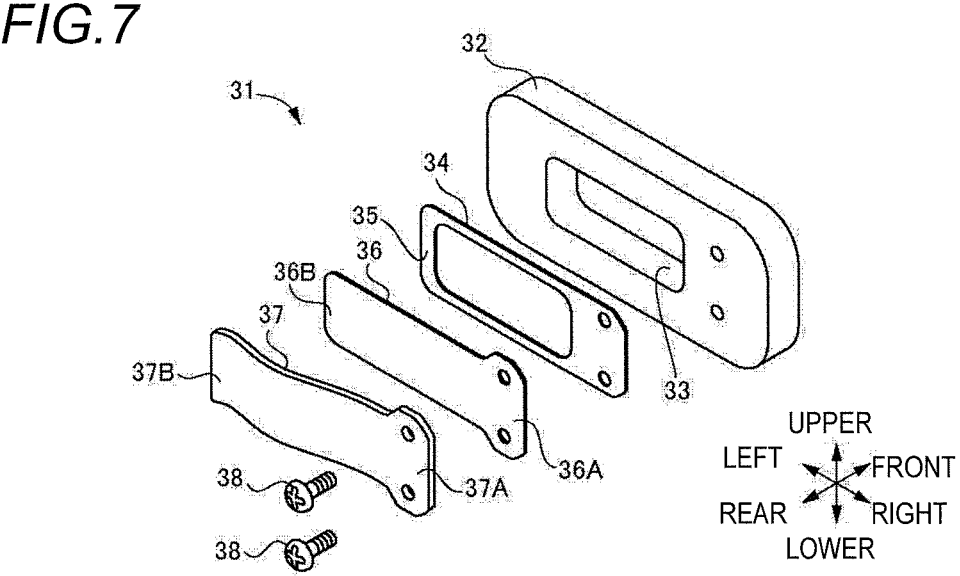
FIG. 7 is an exploded perspective view depicting the reed valve of the secondary air introduction device in accordance with the illustrative embodiment of the present disclosure.
Figure 8:
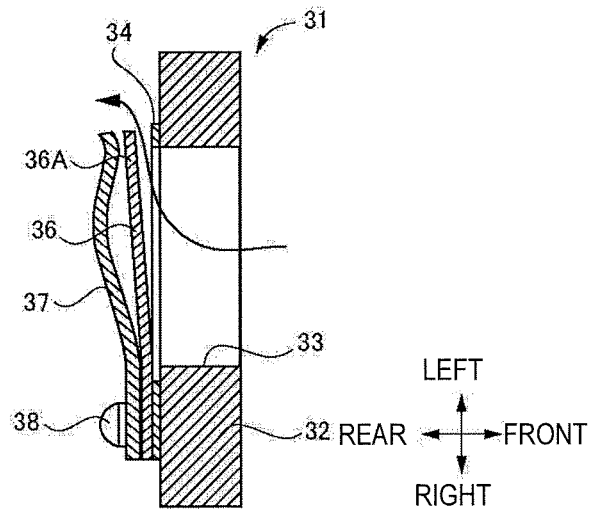
FIG. 8 illustrates an operation of the reed valve of the secondary air introduction device in accordance with the illustrative embodiment of the present disclosure.

FIG. 6 depicts the reed valve 31. FIG. 7 is an exploded perspective view of the reed valve 31. FIG. 8 depicts an operation of the reed valve. The reed valve 31 is a valve configured to open and close the air introduction passage 28, in correspondence to the pressure in the exhaust port 6. As shown in FIG. 5, the reed valve 31 is mounted to the valve mounting part 23 of the valve cover 19. Also, as shown in FIG. 2, the valve cover 19 is mounted to the valve chamber forming concave part 12, so that the reed valve 31 is substantially arranged in the valve chamber 27 to divide the valve chamber 27 into the upstream chamber 27A and the downstream chamber 27B.

As shown in FIG. 6 or 7, the reed valve 31 has a base body 32, a seal member 34, a valve body 36, and a stopper 37.

The base body 32 has a substantially rectangular parallelepiped shape and is formed of metal or resin having high heat resistance, for example. As shown in FIG. 7, the base body 32 is formed with a through-hole 33 for enabling the air to pass from the upstream chamber 27A to the downstream chamber 27B upon opening of the valve. Also, a part of the base body 32, which faces rearward (toward the downstream chamber 27B), is configured to function as a valve seat.

The seal member 34 is a member configured to seal the valve body 36 and the base body 32 therebetween upon closing of the valve, thereby increasing an air-barrier property. The seal member 34 is bonded or applied to a peripheral edge portion of the through-hole 33 on a rear surface of the base body 32. The seal member 34 is a thin film formed of resin having high heat resistance and sealability, such as fluorine rubber or the like, for example. Also, a rear surface of the seal member 34 is configured as a seating surface 35.

The valve body 36 is a member configured to separate from or sitting on the seating surface 35, thereby opening or closing the through-hole 33. The valve body 36 is formed of a material having high heat resistance such as metal, carbon, heat resistant resin or the like, for example. Also, the valve body 36 has such elasticity that it can open and close the through-hole in correspondence to the pressure in the exhaust port 6. Also, the valve body 36 is formed to have a substantially rectangular thin plate shape, and has an area capable of completely closing the through-hole 33. Also, a base end portion (a right end portion) 36A of the valve body 36 is fixed to the rear surface of the base body 32 by screws 38. Also, while a magnitude of the negative pressure in the exhaust port 6 does not exceed a predetermined magnitude and the valve body 36 is not elastically deformed, a lead end-side part (a left side part) 36B of the valve body 36 is seated on the seating surface 35 to close the through-hole 33, so that the flowing of the air from the upstream chamber 27A to the downstream chamber 27B is hindered. On the other hand, when the magnitude of the negative pressure in the exhaust port 6 exceeds the predetermined magnitude, as shown in FIG. 8, the valve body 36 is elastically deformed so that the lead end-side part 36B is moved rearward, and the lead end-side part 36B of the valve body 36 is separated from the seating surface 35, so that the through-hole 33 is opened. Thereby, the air flows from the upstream chamber 27A toward the downstream chamber 27B.

The stopper 37 is a member configured to restrain an amount of movement of the valve body 36 in a separation direction (a direction separating from the seating surface 35). The stopper 37 is formed of metal, for example. A thickness of the stopper 37 is set so that the stopper is not deformed by the pressure in the exhaust port 6. A base end portion (a right end portion) 37A of the stopper 37 is fixed to the rear surface of the base body 32 by the screws 38, together with the valve body 36. As shown in FIG. 3, a lead end-side part (a left side part) of the stopper 37 is distant from the base body 32 or the valve body 36 in a closed state by a predetermined distance, and covers the valve body 36 from the rear. When seeing the reed valve 31 from the rear (when seeing the reed valve 31 in a direction facing from the downstream chamber 27B toward the upstream chamber 27A), the stopper 37 has a shape and an area, which substantially correspond to the valve body 36, and overlaps the valve body 36 (refer to FIG. 13). When the negative pressure in the exhaust port 6 increases and the large suction force is thus applied to the valve body 36, a leading end portion of the valve body 36 is contacted to the stopper 37, so that movement of the valve body 36 is restricted.

(Back-Flow Restriction Member)

Figure 9:
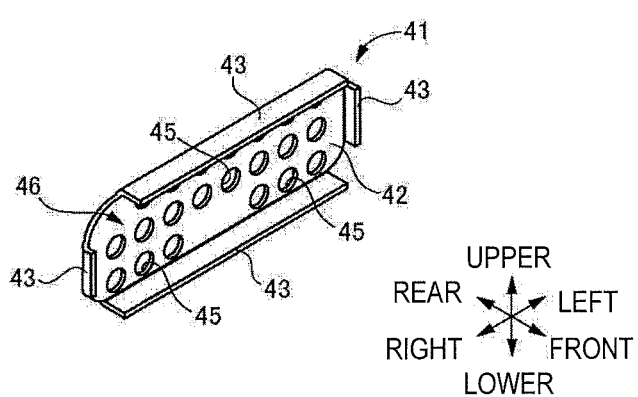
FIG. 9 is a perspective view depicting a back-flow restriction member of the secondary air introduction device in accordance with the illustrative embodiment of the present disclosure.
Figure 10:
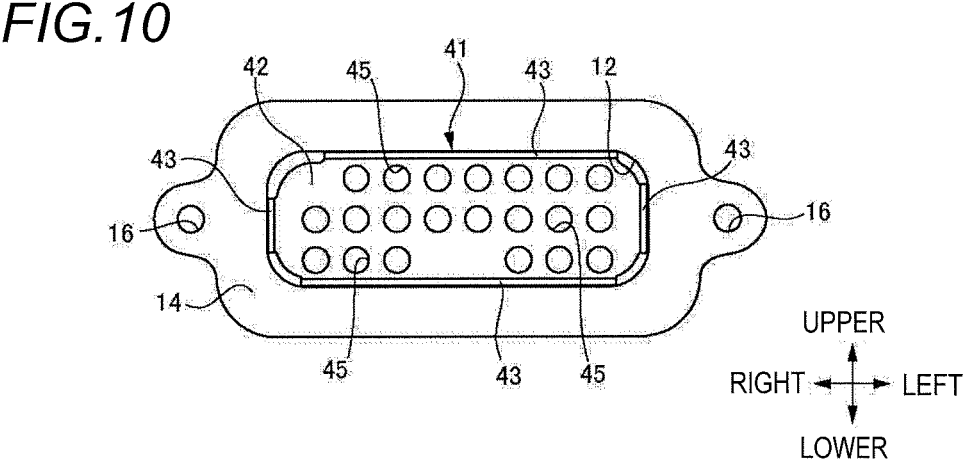
FIG. 10 illustrates a state where the back-flow restriction member is mounted to the valve chamber forming concave part, in the secondary air introduction device in accordance with the illustrative embodiment of the present disclosure.

FIG. 9 depicts the back-flow restriction member 41. FIG. 10 depicts a state where the back-flow restriction member 41 is mounted to the valve chamber forming concave part 12. The back-flow restriction member 41 is a member configured to allow the air to flow from the air cleaner 9 toward the exhaust port 6 upon the opening of the reed valve 31, and to restrict the exhaust air flowing back through the in-head passage 17 from the exhaust port 6 into the valve chamber 27 from directly colliding with the reed valve 31. The back-flow restriction member 41 is formed of metal such as aluminum, for example. The back-flow restriction member 41 has a flat plate part 42 and four side plate parts 43 formed at upper, lower, left and right edge portions of the flat plate part 42. The flat plate part 42 has a shape and an area corresponding to an opening shape (for example, a substantially rectangular shape) and an opening area of the valve chamber forming concave part 12. Also, the flat plate part 42 and the side plate parts 43 have thicknesses set so as not to be deformed due to the flowing of the air and the back-flow of the exhaust air. Also, each side plate part 43 has a function of reinforcing the flat plate part 42 so that the flat plate part is not to be deformed.

The back-flow restriction member 41 is provided between the reed valve 31 and the exhaust port 6, in the air introduction passage 28. Specifically, as shown in FIG. 2, the back-flow restriction member 41 is provided in the downstream chamber 27B. More specifically, as shown in FIG. 10, the back-flow restriction member 41 is fitted to the valve chamber forming concave part 12. At a state where the back-flow restriction member 41 is arranged in the valve chamber forming concave part 12 in this way, a surface of the flat plate part 42 intersects with the extension direction (a direction of an arrow A in FIG. 2 or 12) of the air inflow end-side of the in-head passage 17.

Also, the back-flow restriction member 41 is supported with being interposed between the valve cover 19 and the valve cover mounting part 14, together with the reed valve 31. That is, at a state where the valve cover 19 is fixed to the valve cover mounting part 14 by the bolts 15, the reed valve 31 is supported with being interposed between the valve mounting part 23 and the valve cover mounting part 14, as shown in FIG. 2. The back-flow restriction member 41 is supported with being interposed between the base body 32 of the reed valve 31 and bottom surfaces of the shallow parts 13 of the valve chamber forming concave part 12. Specifically, the left and right parts of the rear surface of the flat plate part 42 of the back-flow restriction member 41 are respectively contacted to the bottom surfaces of the shallow parts 13, and the lead ends of the upper and lower side plate parts 43 of the back-flow restriction member 41 are contacted to the base body 32 of the reed valve 31.

(Air Passing Region and Back-Flow Cutoff Region)

Figure 11:
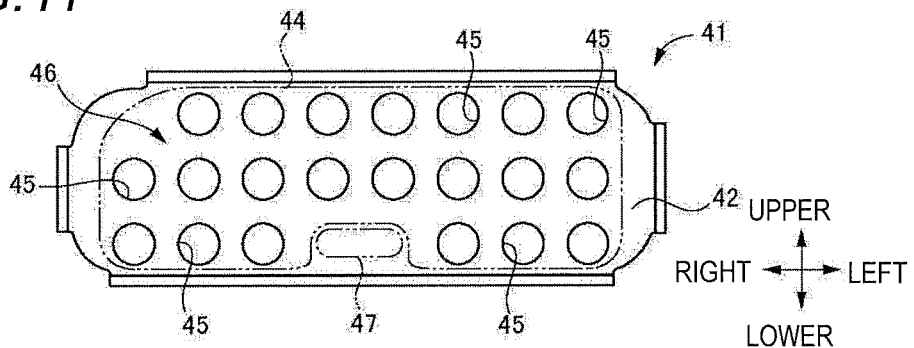
FIG. 11 illustrates an air passing region and a back-flow cutoff region of the back-flow restriction member of the secondary air introduction device in accordance with the illustrative embodiment of the present disclosure.
Figure 12:
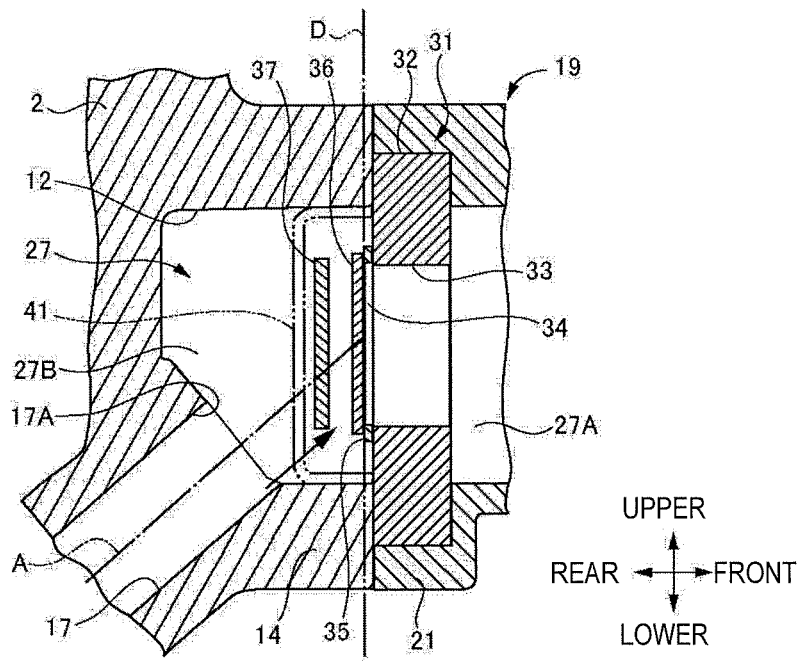
FIG. 12 illustrates an aspect where exhaust air having flowed back directly enters between a valve body and a stopper of the reed valve if there is nothing interposed between the opening of the in-head passage and the reed valve, in the secondary air introduction device in accordance with the illustrative embodiment of the present disclosure.
Figure 13:
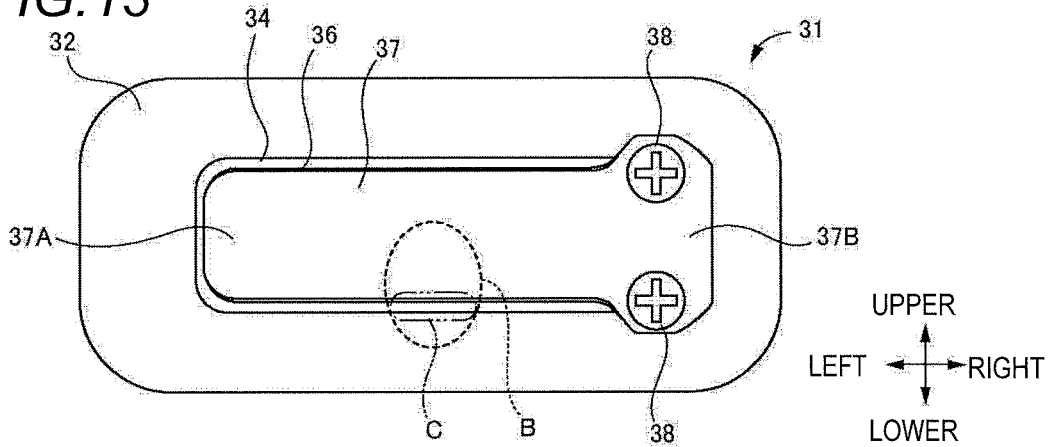
FIG. 13 illustrates a region of the reed valve with which the exhaust air flowing back directly collides if there is nothing interposed between the opening of the in-head passage and the reed valve, in the secondary air introduction device in accordance with the illustrative embodiment of the present disclosure.

FIG. 11 depicts an air passing region 44 and a back-flow cutoff region 47 of the flat plate part 42 of the back-flow restriction member 41. FIG. 12 illustrates an aspect where the exhaust air having flowed back directly enters between the valve body 36 of the reed valve 31 and the stopper 37 if there is nothing interposed between an opening 17A of the in-head passage 17 and the reed valve 31. FIG. 13 illustrates a region of the reed valve 31 with which the exhaust air flowing back directly collides if there is nothing interposed between the opening 17A of the in-head passage 17 and the reed valve 31.

As shown in FIG. 11, the flat plate part 42 of the back-flow restriction member 41 has the air passing region 44 and the back-flow cutoff region 47.

The air passing region 44 is a region in which the air flowing forward through the air introduction passage 28 from the air cleaner 9 toward the exhaust port 6 is enabled to pass therethrough. Specifically, the air passing region 44 is a region in which the air flowing from the upstream chamber 27A toward the downstream chamber 27B is enabled to pass therethrough. The air passing region 44 is provided with a ventilation structure 46 formed by a plurality of aligned holes 45. The plurality of holes 45 of the ventilation structure 46 is aligned in a predetermined pattern. For example, the plurality of holes 45 is aligned with predetermined intervals, and alignment directions are respectively regular in the right and left direction and the upper and lower direction. The air passing region 44 is arranged at a part of the flat plate part 42, except the back-flow cutoff region 47.

When the magnitude of the negative pressure in the exhaust port 6 exceeds a predetermined magnitude due to pulsation of the exhaust air, which is generated after the exhaust air is discharged from the combustion chamber to the exhaust port 6, the reed valve 31 is opened. Thereby, the air taken from the atmospheric air and purified by the air cleaner 9 sequentially passes through the inside of the air introduction hose 26, the inside of the pipe member 24 of the valve cover 19, the upstream chamber 27A, the through-hole 33 of the reed valve 31, the plurality of holes 45 formed in the air passing region 44 of the back-flow restriction member 41, the downstream chamber 27B and the in-head passage 17 from the air cleaner 9 and is sucked into the exhaust port 6 (refer to the arrow in FIG. 1). The air passing region 44 of the back-flow restriction member 41 is formed with the plurality of holes 45 or an area of each hole 45 is large. Also, an area of the air passing region 44 of the flat plate part 42 is larger than an area of the back-flow cutoff region 47, which will be described later. Accordingly, it is possible to suppress a pressure loss of the air flowing from the air cleaner 9 toward the exhaust port 6 from being increased due to the back-flow restriction member 41.

In the meantime, the back-flow cutoff region 47 is a region in which exhaust air, which flows in a direction of directly colliding with the valve body 36 or the seal member 34 of the reed valve 31, of the exhaust air flowing back through the air introduction passage 28 from the exhaust port 6 is cut off. Also, the back-flow cutoff region 47 is a region in which exhaust air, which flows out in a direction of directly entering between the valve body 36 and the stopper 37 of the reed valve 31, of the exhaust air flowing out from the in-head passage 17 toward the downstream chamber 27B is cut off. The back-flow cutoff region 47 is not provided with the ventilation structure 46. That is, the back-flow cutoff region 47 is not formed with any hole 45.

The back-flow cutoff region 47 of the flat plate part 42 is arranged at a part that faces a part of the valve body 36, with which the exhaust air flowing back through the in-head passage 17 directly collides if there is nothing interposed between the opening 17A of the in-head passage 17 and the reed valve 31, in the extension direction (a direction of an arrow A in FIG. 12) of the air inflow end-side of the in-head passage 17.

As shown in FIG. 12, the opening 17A of the air inflow end-side of the in-head passage 17 opens to an intermediate part of a rear and lower part of the downstream chamber 27B in the right and left direction. That is, the opening 17A is located at a rear and lower side of the intermediate part of the reed valve 31 in the right and left direction. Therefore, as shown in FIG. 13, if there is nothing interposed between the opening 17A of the in-head passage 17 and the reed valve 31, the exhaust air flowing back through the in-head passage 17 and flowing out from the opening 17A directly collides with lower parts of the intermediate parts of the valve body 36, the seal member 34 and the stopper 37 of the reed valve 31 in the right and left direction. A region B in FIG. 13 indicates a region of the reed valve 31 with which the exhaust air directly collides. In the region B, a part of the valve body 36 and a part of the seal member 34 are included. A region C in FIG. 13 indicates a part of the region B, in which a part of the valve body 36 and a part of the seal member 34 exist. The region C is a region in which the exhaust air flowing back through the in-head passage 17 and flowing out from the opening 17A directly collides with the valve body 36 or the seal member 34 if there is nothing interposed between the opening 17A of the in-head passage 17 and the reed valve 31. As shown in FIG. 11, the back-flow cutoff region 47 of the back-flow restriction member 41 is arranged at the part of the flat plate part 42 facing the region C in the extension direction of the air inflow end-side of the in-head passage 17.

Immediately after the exhaust valve 7 is opened and the exhaust air is discharged from the combustion chamber toward the exhaust port 6, a part of the exhaust air flows back through the in-head passage 17, and flows out from the opening 17A of the air inflow end-side of the in-head passage 17 into the downstream chamber 27B. Since the back-flow restriction member 41 having the back-flow cutoff region 47 arranged at the part corresponding to the region C is provided between the opening 17A and the reed valve 31, the exhaust air, which flows in the direction of directly colliding with the valve body 36 or the seal member 34 of the reed valve 31, of the exhaust air having flowed out from the opening 17A into the downstream chamber 27B directly collides with the back-flow cutoff region 47 of the back-flow restriction member 41. Thereby, the exhaust air having flowed out from the opening 17A into the downstream chamber 27B does not directly collide with the valve body 36 or the seal member 34.

Also, the back-flow cutoff region 47 of the flat plate part 42 is arranged at a part that faces a part of the reed valve 31, in which the exhaust air directly enters between the valve body 36 and the stopper 37 if there is nothing interposed between the opening 17A of the in-head passage 17 and the reed valve 31, in the extension direction of the air inflow end-side of the in-head passage 17.

As shown in FIG. 12, the extension direction (the direction of the arrow A) of the air inflow end-side of the in-head passage 17 intersects with a plane D including the seating surface 35 of the reed valve 31 in an oblique direction. The opening 17A of the air inflow end-side of the in-head passage 17 is located below the rear of the intermediate part of the reed valve 31 in the right and left direction. As a result, if there is nothing interposed between the opening 17A of the in-head passage 17 and the reed valve 31, a part of the exhaust air flowing out from the opening 17A directly enters between the valve body 36 and the stopper 37 from the lower side of the rear of the reed valve 31 (refer to the arrow in FIG. 12).

In the region C of FIG. 13, the entire part in which the exhaust air directly enters between the valve body 36 and the stopper 37 if there is nothing interposed between the opening 17A of the in-head passage 17 and the reed valve 31 is included. As can be seen from comparison of FIGS. 11 and 13, the back-flow cutoff region 47 of the back-flow restriction member 41 corresponds to the region C. The back-flow restriction member 41 having the back-flow cutoff region 47 arranged at the part corresponding to the region C is provided between the opening 17A and the reed valve 31, in the downstream chamber 27B. Therefore, the exhaust air, which flows out in the direction of directly entering between the valve body 36 and the stopper 37 of the reed valve 31, of the exhaust air flowing back through the in-head passage 17 and flowing out from the opening 17A of the air inflow end-side of the in-head passage 17 into the downstream chamber 27B directly collides with the back-flow cutoff region 47 of the back-flow restriction member 41. Thereby, the exhaust air having flowed out from the opening 17A into the downstream chamber 27B does not directly enter between the valve body 36 and the stopper 37.

As described above, according to the secondary air introduction device 11 of the illustrative embodiment of the present disclosure, since the back-flow restriction member 41 having the back-flow cutoff region 47, in which the ventilation structure 46 is not formed, is provided between the opening 17A of the in-head passage 17 and the reed valve 31, it is possible to prevent the exhaust air flowing back through the in-head passage 17 from the exhaust port 6 from directly colliding with the valve body 36 or the seal member 34 of the reed valve 31. Therefore, it is possible to prevent the valve body 36 from being vibrated, which is caused when the high-pressure exhaust air directly collides with the valve body 36. Thereby, it is possible to prevent the valve body 36 from being deteriorated or damaged in early stage due to the vibration. Also, it is possible to prevent the seal member 34 from being deteriorated or eroded in early stage, which is caused when the high-temperature exhaust air directly collides with the seal member 34.

Also, according to the secondary air introduction device 11 of the illustrative embodiment of the present disclosure, since it is possible to prevent the valve body 36 from being vibrated, it is possible to prevent the high-temperature exhaust air from passing through a gap, which is formed when the valve body 36 is separated from the seating surface 35 due to the vibration, and flowing back toward the air cleaner 9. Therefore, it is possible to prevent the seal member 34 of the reed valve 31, the valve cover 19, the air introduction hose 26, and the like from being deteriorated or damaged in early stage due to heat of the exhaust air.

Also, since the back-flow cutoff region 47 of the back-flow restriction member 41 is arranged at the part of the flat plate part 42, which faces the part of the valve body 36 or the seal member 34, with which the exhaust air flowing back directly collides, in the extension direction of the in-head passage 17, it is possible to enable the exhaust air, which flows in the direction of directly colliding with the valve body 36 or the seal member 34, of the exhaust air flowing back to securely collide with the back-flow cutoff region 47. Thereby, it is possible to securely prevent the exhaust air from directly colliding with the valve body 36 or the seal member 34.

Also, according to the secondary air introduction device 11 of the illustrative embodiment of the present disclosure, since the back-flow restriction member 41 having the back-flow cutoff region 47, in which the ventilation structure 46 is not formed, is provided between the opening 17A of the in-head passage 17 and the reed valve 31, it is possible to prevent the exhaust air having flowed out at high speed from the opening 17A of the in-head passage 17 into the downstream chamber 27B from directly entering between the valve body 36 and the stopper 37 of the reed valve 31. Accordingly, it is possible to prevent the valve body 36 from being floated from the seating surface 35, which is caused when the exhaust air flows between the valve body 36 and the stopper 37 at high speed. Thereby, it is possible to prevent the high-temperature exhaust air from passing through a gap, which is formed between the valve body 36 and the seating surface 35 when the valve body 36 is floated, and flowing back toward the air cleaner 9. Therefore, it is possible to prevent the seal member 34 of the reed valve 31, the valve cover 19, the air introduction hose 26 and the like from being deteriorated or damaged in early stage.

Also, according to the secondary air introduction device 11 of the illustrative embodiment of the present disclosure, since the air passing region 44 of the flat plate part 42 of the back-flow restriction member 41 except the back-flow cutoff region 47 is formed with the ventilation structure 46 having the plurality of holes 45, it is possible to suppress an increase in pressure loss of the air flowing from the air cleaner 9 toward the exhaust port 6 due to the negative pressure generated in the exhaust port 6.

Also, according to the secondary air introduction device 11 of the illustrative embodiment of the present disclosure, since the back-flow cutoff region 47 of the flat plate part 42 is restricted to the part that faces the region in which the exhaust air having flowed back directly collides with the valve body 36 or the seal member 34, it is possible to increase an area of the air passing region 44. Thereby, it is possible to increase the effect of suppressing the increase in pressure loss of the air flowing from the air cleaner 9 toward the exhaust port 6.

Also, according to the secondary air introduction device 11 of the illustrative embodiment of the present disclosure, it is possible to prevent the exhaust air having flowed back from directly colliding with the valve body 36 or the seal member 34 of the reed valve 31. Therefore, even when the reed valve 31 should be arranged in the vicinity of the exhaust port due to situations and the like of the specific structure of the cylinder head or the engine, so that an amount of the exhaust air flowing back from the exhaust port and flowing out into the valve chamber increases, the pressure of the exhaust air increases or the temperature of the exhaust air increases, it is possible to suppress the valve body 36 and the seal member 34 from being deteriorated or damaged.

Also, according to the secondary air introduction device 11 of the illustrative embodiment of the present disclosure, the exhaust air having flowed back passes through the holes 45 formed in the air passing region 44. At this time, a part of heat of the exhaust air is dissipated by the back-flow restriction member 41. Thereby, it is possible to lower the temperature of the exhaust air to be injected to the base body 32 and the stopper 37 of the reed valve 31.

(Modified Embodiments of Back-Flow Restriction Member)

Figure 14:
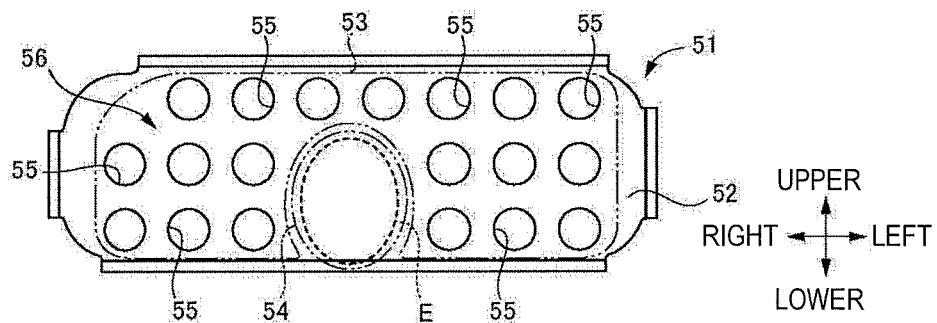
FIG. 14 illustrates a first modified embodiment of the back-flow restriction member of the secondary air introduction device in accordance with the illustrative embodiment of the present disclosure.

FIG. 14 depicts a first modified embodiment of the back-flow restriction member provided in the secondary air introduction device 11 of the illustrative embodiment of the present disclosure. As shown in FIG. 14, a back-flow restriction member 51 in accordance with the first modified embodiment of the back-flow restriction member of the secondary air introduction device 11 has a plate part 52, and the plate part 52 has an air passing region 53 and a back-flow cutoff region 54. Also, the air passing region 53 is provided with a ventilation structure 56 formed by a plurality of aligned holes 55. On the other hand, the back-flow cutoff region 54 is not provided with the ventilation structure 56. Also, the back-flow cutoff region 54 of the back-flow restriction member 51 of the first modified embodiment includes an entire region E formed by projecting the opening 17A of the in-head passage 17 onto a rear surface of the plate part 52. The region E is formed by projecting the opening 17A (an inner space of the end portion of the in-head passage 17 opening to the downstream chamber 27B) onto the rear surface of the plate part 52 at a state where a point of view is set to a center of the opening 17A and a direction of a line of sight is set to the extension direction of the air inflow end-side of the in-head passage 17.

The region E substantially coincides with a region in which the exhaust air having flowed back through the in-head passage 17 and having flowed out from the opening 17A collides with the rear surface of the plate part 52. When seeing the reed valve 31 from the center of the opening 17A along the extension direction of the air inflow end-side of the in-head passage 17, the region E substantially coincides with the region (the region B in FIG. 13) of the reed valve 31, with which the exhaust air directly collides if there is nothing interposed between the opening 17A of the in-head passage 17 and the reed valve 31. The region B includes the region (the region C in FIG. 13), in which the exhaust air directly collides with the valve body 36 or the seal member 34 if there is nothing interposed between the opening 17A of the in-head passage 17 and the reed valve 31. Therefore, the arrangement and area of the back-flow cutoff region 54 are set to include the entire region E, so that it is possible to cut off the entire exhaust air, which flows in the direction of directly colliding with the valve body 36 or the seal member 34 of the reed valve 31, by the back-flow restriction member 51. Accordingly, even with the back-flow restriction member 51 of the first modified embodiment, it is possible to prevent the valve body 36 from being vibrated, which is caused when the high-pressure exhaust air directly collides with the valve body 36, the valve body 36 from being floated, which is caused when the high-speed exhaust air directly enters between the valve body 36 and the stopper 37, and the seal member 34 of the reed valve 31, the valve cover 19, the air introduction hose 26 and the like from being damaged, which is caused when the high-temperature exhaust air flows back toward the air cleaner 9 beyond the reed valve 31.

Also, an area of the back-flow cutoff region 54 of the back-flow restriction member 51 of the first modified embodiment is greater than the area of the back-flow cutoff region 47 of the back-flow restriction member 41. Therefore, even when the back-flow restriction member 51 is positionally misaligned due to any reason, for example, it is possible to prevent the exhaust air having flowed back from directly colliding with the valve body 36 or the seal member 34.

Figure 15:
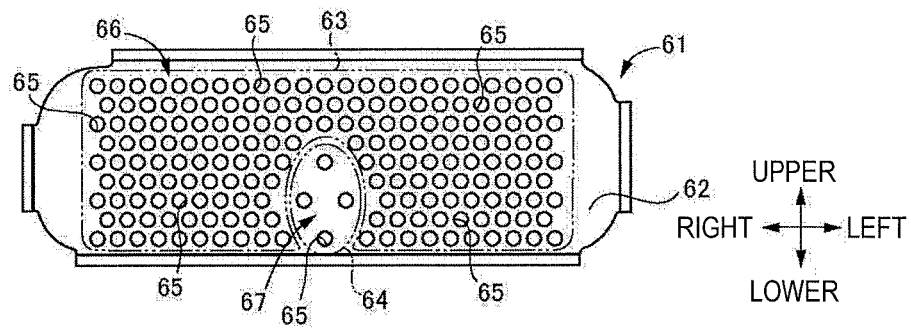
FIG. 15 illustrates a second modified embodiment of the back-flow restriction member of the secondary air introduction device in accordance with the illustrative embodiment of the present disclosure.

FIG. 14 depicts a second modified embodiment of the back-flow restriction member provided in the secondary air introduction device 11 of the illustrative embodiment of the present disclosure. As shown in FIG. 15, a back-flow restriction member 61 in accordance with the second modified embodiment of the back-flow restriction member of the secondary air introduction device 11 has a plate part 62, and the plate part 62 has an air passing region 63 and a back-flow cutoff region 64 to which ventilation structures 66, 67 formed by a plurality of aligned holes 65 are respectively provided. The ventilation structure 67 provided in the back-flow cutoff region 64 has a structure configured to restrict the flowing of the air or the exhaust air, as compared to the ventilation structure 66 provided in the air passing region 63. Specifically, the ventilation structure 67 provided in the back-flow cutoff region 64 has a smaller number of the holes 65 per a unit area, as compared to the ventilation structure 66 provided in the air passing region 63.

In the air passing region 63, since the number of the holes 65 per a unit area is large, the air flowing from the air cleaner 9 toward the exhaust port 6 can smoothly pass therethrough. On the other hand, in the back-flow cutoff region 64, since the number of the holes 65 per a unit area is small, it is possible to substantially cut off the exhaust air, which flows in the direction of directly colliding with the valve body 36 or the seal member 34 of the reed valve 31, of the exhaust air flowing back through the in-head passage 17 from the exhaust port 6. Therefore, according to the back-flow restriction member 61 of the second modified embodiment, it is possible to secure the function of introducing the air into the exhaust port 6 and to prevent the valve body 36 of the reed valve 31, the seal member 34, the valve cover 19, the air introduction hose 26 and the like from being damaged.

Figure 16:
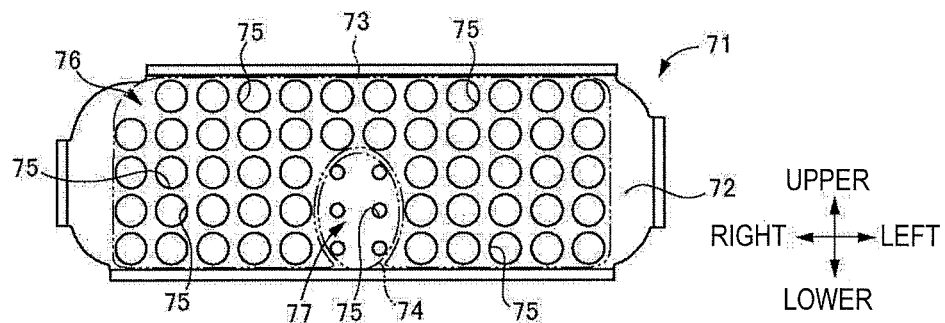
FIG. 16 illustrates a third modified embodiment of the back-flow restriction member of the secondary air introduction device in accordance with the illustrative embodiment of the present disclosure.

FIG. 16 depicts a third modified embodiment of the back-flow restriction member provided in the secondary air introduction device 11 of the illustrative embodiment of the present disclosure. As shown in FIG. 16, a back-flow restriction member 71 in accordance with the third modified embodiment of the back-flow restriction member of the secondary air introduction device 11 has a plate part 72, and the plate part 72 has an air passing region 73 and a back-flow cutoff region 74 to which ventilation structures 76, 77 formed by a plurality of aligned holes 75 are respectively provided. The ventilation structure 77 provided in the back-flow cutoff region 74 has a structure configured to restrict the flowing of the air or the exhaust air, as compared to the ventilation structure 76 provided in the air passing region 73. Specifically, a ratio of a summed area of the plurality of holes 75 aligned in the back-flow cutoff region 74 to an entire area of the back-flow cutoff region 74 is smaller than a ratio of a summed area of the plurality of holes 75 aligned in the air passing region 73 to an entire area of the air passing region 73.

In the air passing region 73, since the ratio of the summed area of the plurality of holes 75 aligned in the air passing region 73 to the entire area of the air passing region 73 is large, the air flowing from the air cleaner 9 toward the exhaust port 6 can smoothly pass therethrough. On the other hand, in the back-flow cutoff region 74, since the ratio of the summed area of the plurality of holes 75 aligned in the back-flow cutoff region 74 to the entire area of the back-flow cutoff region 74 is small, it is possible to substantially cut off the exhaust air, which flows in the direction of directly colliding with the valve body 36 or the seal member 34 of the reed valve 31, of the exhaust air flowing back through the in-head passage 17 from the exhaust port 6. Therefore, even with the back-flow restriction member 71 of the third modified embodiment, it is possible to secure the function of introducing the air into the exhaust port 6 and to prevent the valve body 36 of the reed valve 31, the seal member 34, the valve cover 19, the air introduction hose 26 and the like from being damaged.

In the above illustrative embodiment, the flat plate part 42 of the back-flow restriction member 41 is provided with the air passing region 44 and the back-flow cutoff region 47. However, the side plate part 43 may be provided with the air passing region 44 or the back-flow cutoff region 47.

Also, in the above illustrative embodiment, the holes 45 formed in the air passing region 44 of the back-flow restriction member 41 are aligned with the predetermined intervals, and the alignment directions are respectively regular in the right and left direction and the upper and lower direction. However, the plurality of holes 45 may be randomly arranged in the air passing region 44, instead of regularly aligning the holes 45 in the air passing region 44. Also, the ventilation structure 46 provided in the air passing region 44 may be formed by a metallic mesh or the like. In this case, meshes of the metallic mesh correspond to the holes through which the air is to pass.

Also, in the above illustrative embodiment, the air introduction passage 28 configured to introduce the air into the exhaust port 6 is formed by the inside of the air introduction hose 26, the inside of the pipe member 24 of the valve cover 19, the valve chamber 27, and the in-head passage 13. However, the configuration of the air introduction passage 28 is not limited thereto. That is, the configuration of the air introduction passage 28 may be changed, depending on the structure of the specific engine, and the like.

Also, the secondary air introduction device of the present disclosure is not limited to the four-valve engine, and can be applied to the other engines. Also, the secondary air introduction device of the present disclosure is not limited to the engine for motorcycle, and can be applied to an engine for other vehicle or ship.

Also, the main correspondence relations between the illustrative embodiment and the claims are described. The terms that are different between the illustrative embodiment and the claims are described. The air cleaner 9 is a specific example of the air intake unit. Also, the air introduction hose 26, the valve cover 19 and the cylinder head 1 are a specific example of the air introduction unit. Also, the inside of the air introduction hose 26, the inside of the pipe member 24, the valve chamber 27, and the in-head passage 17 are a specific example of the air introduction passage. Also, the inside of the air introduction hose 26 and the inside of the pipe member 24 are a specific example of the first passage, and the in-head passage 17 is a specific example of the second passage. Also, the upstream chamber 27A is a specific example of the first chamber, and the downstream chamber 27B is a specific example of the second chamber. Also, the flat plate part 42 is a specific example of the plate part.

Also, the present disclosure can be appropriately changed without departing from the gist or scope of the present disclosure that can understood from the claims and the specification, the changed secondary air introduction device is also included in the technical spirit of the present disclosure.

What is claimed is:

1. A secondary air introduction device configured to introduce air into an exhaust port provided in a cylinder head of an engine by using a negative pressure in the exhaust port, the secondary air introduction device comprising:
   an air introduction passage configured to interconnect an air intake unit for taking therein atmospheric air and the exhaust port;
   a reed valve provided in the air introduction passage and configured to open and close the air introduction passage in correspondence to a pressure in the exhaust port; and
   a back-flow restriction member provided between the reed valve and the exhaust port in the air introduction passage, and comprising a plate part having a surface intersecting with an extension direction of the air introduction passage,
   wherein the plate part has an air passing region in which the air flowing through the air introduction passage from the air intake unit toward the exhaust port is enabled to pass therethrough and a back-flow cutoff region in which exhaust air, which flows in a direction of directly colliding with at least a valve body of the reed valve, of exhaust air flowing back through the air introduction passage from the exhaust port is cut off, wherein the air passing region and the back-flow cutoff region of the plate part are respectively provided with a ventilation structure formed by a plurality of aligned holes, and wherein the ventilation structure provided in the back-flow cutoff region has a smaller number of holes per a unit area, as compared to the ventilation structure provided in the air passing region.

2. The secondary air introduction device according to claim 1, wherein the back-flow cutoff region is arranged at a part of the plate part, which faces a part of the valve body, with which the exhaust air flowing back through the air introduction passage from the exhaust port is to directly collide, in the extension direction of the air introduction passage.

3. The secondary air introduction device according to claim 1, wherein the air introduction passage comprises a valve chamber, a first passage configured to interconnect the air intake unit and the valve chamber, and a second passage configured to interconnect the valve chamber and the exhaust port, wherein the reed valve is provided in divide the valve chamber into a first chamber to which the first passage is connected and a second chamber to which the second passage is connected, wherein the back-flow restriction member is provided in the second chamber, and wherein the back-flow cutoff region comprises a part or all of a region formed by projecting an opening of the second passage opening into the second chamber onto a surface of the plate part facing toward the exhaust port.

4. The secondary air introduction device according to claim 3, wherein the reed valve comprises a base body having a seating surface provided on a surface facing toward the second chamber, the valve body provided in the base body and configured to separate from or sitting on the seating surface, and a stopper configured to restrain an amount of movement of the valve body in a direction of separating from the seating surface, wherein the second passage is provided so that a part of the exhaust air is to flow out from the second passage into the second chamber in a direction of directly entering between the valve body and the stopper, and wherein the back-flow cutoff region is configured to cut off the exhaust air, which is to flow out in the direction of directly entering at least between the valve body and the stopper, of the exhaust air flowing out from the second passage into the second chamber.

5. A secondary air introduction device configured to introduce air into an exhaust port provided in a cylinder head of an engine by using a negative pressure in the exhaust port, the secondary air introduction device comprising:

an air introduction passage configured to interconnect an air intake unit for taking therein atmospheric air and the exhaust port;

a reed valve provided in the air introduction passage and configured to open and close the air introduction passage in correspondence to a pressure in the exhaust port; and a back-flow restriction member provided between the reed valve and the exhaust port in the air introduction passage, and comprising a plate part having a surface intersecting with an extension direction of the air introduction passage, wherein the plate part has an air passing region in which the air flowing through the air introduction passage from the air intake unit toward the exhaust port is enabled to pass therethrough and a back-flow cutoff region in which exhaust air, which flows in a direction of directly colliding with at least a valve body of the reed valve, of exhaust air flowing back through the air introduction passage from the exhaust port is cut off, wherein the air passing region and the back-flow cutoff region of the plate part are respectively provided with a ventilation structure formed by a plurality of aligned holes, and wherein a ratio of a summed area of the plurality of holes aligned in the back-flow cutoff region to an entire area of the back-flow cutoff region is smaller than a ratio of a summed area of the plurality of holes aligned in the air passing region to an entire area of the air passing region.

* * * * *